Feb. 24, 1959 W. C. ROWE 2,874,743
WHITE SIDEWALL FOR PNEUMATIC TIRES
Filed Aug. 23, 1955
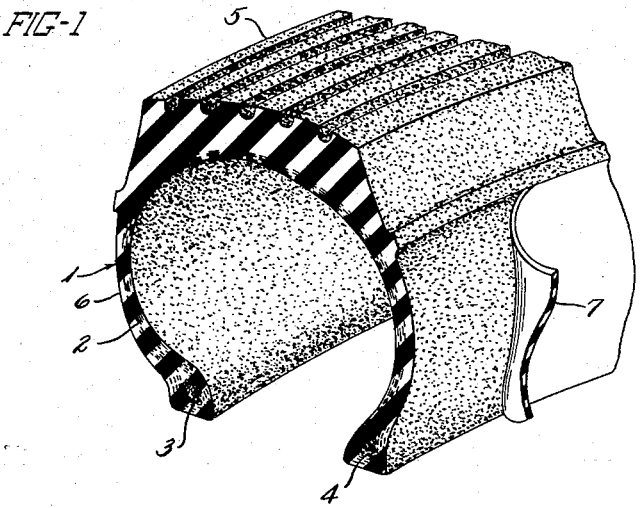
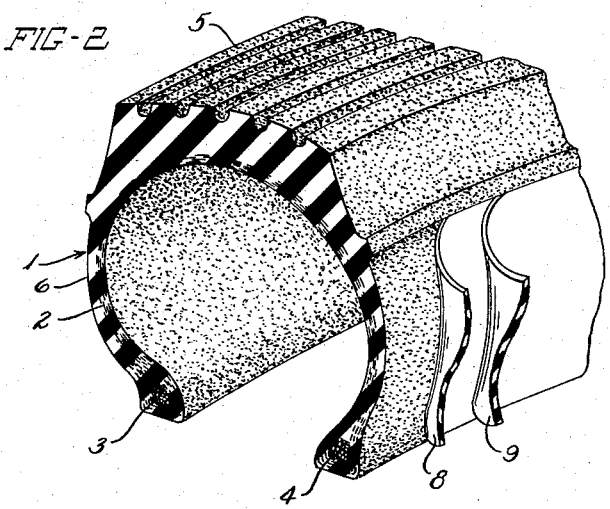
INVENTOR.
WALTER C. ROWE
BY W. A. Fraser
ATTY.

United States Patent Office 2,874,743
Patented Feb. 24, 1959

2,874,743

WHITE SIDEWALL FOR PNEUMATIC TIRES

Walter C. Rowe, Akron, Ohio, assignor to The Firestone Tire & Rubber Company, Akron, Ohio, a corporation of Ohio Application August 23, 1955, Serial No. 530,095

10 Claims. (Cl. 152—330)

This invention relates to novel compositions of matter and more particularly to a novel rubbery composition of butyl type rubber unusually well suited for use in the sidewalls of pneumatic tires.

Butyl type rubber is the commercial name for the copolymer of an isoolefin having from 4 to 7 carbon atoms with an open chain conjugated diolefin having from 4 to 8 carbons. The most commonly known butyl rubbers are copolymers of from 80 to 99½ percent isobutylene and from 20 to .5 percent isoprene.

Copolymers of the butyl type are rubbery and heat softenable in the unvulcanized state and may be compounded with modifying oils, fillers and antioxidants and molded and vulcanized into permanent shape. Compositions containing butyl rubber are substantially inert to the effects of oxygen, ozone and sunlight and for that reason, it would be expected that such compositions would make excellent tire sidewall stocks.

Some disadvantages exist, however, in the use of butyl stock in tire sidewalls. Although resistant to the effects of weather, such stocks have poor abrasion resistance and show the marks of curb scuffing when the finished tire is used on a car. Poor abrasion resistance also leads to poor buffing characteristics of the tire sidewall after the tire comes out of the vulcanizing mold in that buffing with a wire brush or the like to clean off the mold dirt disfigures the indicia molded on the tire sidewall. The prior art butyl tire sidewall stocks also had poor cohesion and during the stress of a sidewall shaping operation such as tubing, the long ribbon formed would crack and craze to give a rough cracked surface. These and other failings make previously known butyl rubber type white sidewalls unsatisfactory for commercial use.

The present invention overcomes the failings of prior art butyl compounds through the use of a mixture of butyl rubber with chlorosulfonated polythene and in another form of the invention with exceptionally high volume loadings of reinforcing fillers.

It is therefore an object of this invention to provide a new composition of matter, to provide a butyl type tire sidewall composition much improved over the prior art butyl sidewall compositions, to provide a mixture of butyl type rubber with chlorosulfonated polythene having improved properties when used as the sidewall of a pneumatic tire, to provide an improved stain resistant barrier for the white sidewall of a black tire and to provide an improved tire sidewall comprised of a mixture of butyl type rubber with chlorosulfonated polythene and unusually high amounts of reinforcing filler.

These and other objects of the invention will be obvious by reference to the specification, claims, and drawing of which:

Fig. 1 is a fragmentary sectional view of a tire having a sidewall of the invention;

Fig. 2 is a sectional view of a tire having a white sidewall barrier of the invention.

Referring to Fig. 1, a white sidewall tire generally indicated at 1, is comprised of a toroidal fabric body portion 2 terminating at each edge in inextensible metal bead portions 3 and 4. A tread 5 and black sidewall 6 and a white sidewall portion 7 are bonded by vulcanization to the body 2. There are no migratory staining materials in any of the elements of the tire shown in Fig. 1.

In Fig. 2, a tire is shown having the same construction as the tire of Fig. 1 except that a barrier 8 comprised of the novel composition of the invention separates the white sidewall 9 from the other rubbery components of the tire which contain migratory staining materials. Barrier 8 serves to stop migration of staining materials from the tire into sidewall 9 to discolor that member.

An example of the novel composition of the invention as it is used in a white sidewall compound for a tire is as follows:

|  | Prior Art White Sidewall | Novel Stock |
|---|---|---|
| Butyl Rubber | 100 | 80.00 |
| Chlorosulfonated Polythene |  | 20.00 |
| Zinc Oxide | 70 | 20.00 |
| Titanium Dioxide | 20 | 46.00 |
| Magnesium Dioxide (Light Calcinated) |  | 4.00 |
| Silica Dioxide |  | 39.00 |
| Stearic Acid | .85 | .85 |
| Ultramarine Blue | .20 | .20 |
| Stabilite Ester | 5.00 | 5.00 |
| Medium Process Oil | 5.00 | 5.00 |
| Paraffin Wax | 5.00 | 5.00 |
| Tetramethylthiuram Disulfide | 1.00 | 1.00 |
| Sulfur | 2.00 | 2.00 |
| Captax [1] | 1.50 | 1.50 |

[1] 2-mercaptobenzothiazole sold by the R. T. Vanderbilt Company.

The above composition was prepared by mixing the butyl rubber and the chlorosulfonated polythene on an open two roll mill to form a continuous band and then slowly adding the pigments. The sulfur and accelerators were held until last and added and dispersed in the composition just before it was removed from the mill to prevent partial vulcanization or "setting up" on the mill.

The mixed homogeneous mass was removed from the mill, formed into the shape of an unvulcanized tire sidewall and vulcanized to a tire. The unvulcanized sidewall showed excellent cohesion and did not crack during the sidewall shaping operation. Molded indicia protruding from the sidewall of the vulcanized tire stood up exceptionally well under buffing. The finished sidewall had a hard surface and did not easily scuff when the tire rubbed the curb nor did it easily pick up discoloring dirt.

The physical properties of the novel composition are much superior to the prior art butyl sidewall compositions as is shown by the following:

|  | Prior Art Butyl Stock | Butyl-Chlorosulfonated Polythene Stock |
|---|---|---|
| Modulus @ 300% | 150 p. s. i. | 1,125 p. s. i. |
| Tensile | 2,300 p. s. i. | 1,675 p. s.i. |
| Elongation | 910% | 470%. |
| Resistance to: |  |  |
| Scuffing | Poor | Excellent. |
| Dirt Pick Up | Bad | Very Slight. |
| Cured Surface Tackiness | Considerable | None. |

In addition to the example set out, it has been found that the zinc oxide content may vary between 15 and 40 parts, the titanium dioxide content between 20 to 47 parts and the silica dioxide content between 30 and 50 parts, all parts in this and all examples being based on 100 parts by weight total of butyl and chlorosulfonated polythene. The parts of filler made up of a mixture of these fillers must be such that a total of 110 to 137 parts is present in the compound, with 115 parts total preferred.

The butyl rubber used may be selected from the many available on the commercial market. The chlorosulfonated polythene used is available under the trade name Hypalon[1] while the silica dioxide used is available under the trade name Hi-Sil.[2]

A surprising feature of the invention is the fact that the normal migratory staining materials generally found in the vulcanized rubber components of a tire do not migrate into or through the novel composition. This feature makes the composition not only ideal for tire white sidewalls containing migratory staining material but also as a stock for use as a barrier or partition 8 (Fig. 2) between a white sidewall which is susceptible to staining by such materials and the other components of tires containing such materials.

The proportions of certain materials have been designated as critical but the proportions of the other materials may be adjusted to give desired properties. For example, those skilled in the art will readily see that proportions of sulfur and accelerators may be adjusted to give the desired state of cure.

It will also be apparent to those skilled in the art that modifications may be made within the scope of the invention as set forth in the following claims.

I claim:

1. A new composition of matter, comprised of 80 parts of a rubbery copolymer of not less than 80% by weight of an iso-olefin having from 4 to 7 carbon atoms, with at least 20% by weight of an open chain conjugated di-olefin having from 4 to 8 carbon atoms, 20 parts of chlorosulphonated polyethylene, and at least 110 parts total of reenforcing filler, said made up of from 15 to 40 parts of zinc oxide, from 20 to 47 parts of titanium dioxide, and from 30 to 50 parts of silica dioxide, all parts based on 100 parts by weight of copolymer and chlorosulfonated polyethylene.

2. A new composition of matter, comprised of from 70 to 90 parts of a copolymer of not less than 80% by weight of an iso-olefin having from 4 to 7 carbon atoms with at least 20% by weight of an open chain conjugated di-olefin having from 4 to 8 carbon atoms, from 10 to 30 parts of chlorosulphonated polyethylene, and at least 110 parts total of reenforcing filler, made up of from 15 to 40 parts zinc oxide, from 20 to 47 parts titanium dioxide, and from 30 to 50 parts silica dioxide, all parts based on 100 parts by weight of copolymer and chlorosulfonated polyethylene.

3. A new composition of matter, comprised of 70 to 90 parts of rubbery copolymer of not less than 80% by weight of an iso-olefin having from 4 to 7 carbon atoms with at least 20% by weight of an open chain conjugated di-olefin having from 4 to 8 carbon atoms, from 10 to 30 parts of chlorosulphonated polyethylene, and from 110 to 137 parts total of reinforcing filler, said total made up of from 15 to 40 parts of zinc oxide, from 20 to 47 parts of titanium dioxide, and from 30 to 50 parts of silica dioxide, all parts based on 100 parts by weight of copolymer and chlorosulfonated polyethylene.

4. A laminated composite structure, comprised of a staining body containing migratory staining materials, a light colored stainable body, susceptible to stain by said materials, and a barrier layer between and bonded to each of said bodies said barrier layer being comprised of 70 to 90 parts of a copolymer of not less than 80% by weight of isobutylene with at least 20% by weight of isoprene, 10 to 30 parts of chlorosulphonated polyethylene, and from 110 to 137 parts total of reinforcing filler said total made up of from 20 to 47 parts of titanium dioxide, from 15 to 40 parts of zinc oxide, and from 30 to 50 parts of silica dioxide, all parts based on 100 parts of copolymer and chlorosulfonated polyethylene, said barrier being impervious to the passage of said migratory staining materials.

5. A laminated composite structure, comprised of a staining body containing migratory staining materials, a light colored stainable body, susceptible to stain by said materials, and a barrier layer between and bonded to said bodies, said barrier layer being comprised of 80 parts of a rubbery copolymer of not less than 80% by weight of an iso-olefin having from 4 to 7 carbon atoms, with at least 20% by weight of an open chain conjugated di-olefin having from 4 to 8 carbon atoms, 20 parts of chlorosulphonated polyethylene, and at least 110 parts total of a reinforcing filler made up of from 15 to 40 parts of zinc oxide, from 20 to 47 parts titanium dioxide, and from 30 to 50 parts silica dioxide, all parts based on 100 parts by weight total of copolymer and chlorosulphonated polyethylene, said barrier being impervious to the passage of said migratory staining materials.

6. A laminated composite structure, comprised of a staining body containing migratory staining materials bonded to a light-colored body, said light-colored body comprised of 70 to 90 parts of not less than 80% by weight of a copolymer of isobutylene with at least 20% by weight of isoprene, 30 to 10 parts of chlorosulphonated polyethylene, and at least 110 parts total of a reinforcing filler made up of from 15 to 40 parts of zinc oxide, from 20 to 47 parts of titanium dioxide, and from 30 to 50 parts of silica dioxide, all parts based on 100 parts of copolymer and chlorosulfonated polyethylene, said light-colored body being impervious to the passage of said staining materials.

7. An improved white sidewall for pneumatic tires, comprised of substantially 80 parts of a copolymer of at least 80% by weight of isobutylene with at least 20% by weight of isoprene, substantially 20 parts of chlorosulphonated polyethylene, and at least 110 parts total of a reinforcing filler made up of from 15 to 40 parts of zinc oxide, from 30 to 50 parts of silica dioxide, and from 20 to 47 parts of titanium dioxide, all parts based on 100 parts of co-polymer and chlorosulfonated polyethylene.

8. An improved white sidewall for a pneumatic tire, comprised of 70 to 90 parts of a copolymer of at least 80% by weight of isobutylene with at least 20% by weight of isoprene, 30 to 10 parts of chlorosulphonated polyethylene, and at least 110 parts total of a reinforcing filler made up of from 15 to 40 parts of zinc oxide, 20 to 47 parts of titanium dioxide, and from 30 to 50 parts of silica dioxide, all parts based on 100 parts of rubber and chlorosulfonated polyethylene.

9. An improved white sidewall for pneumatic tires, comprised of 70 to 90 parts of a copolymer of at least 80% by weight of isobutylene and with at least 20% by weight of isoprene, 30 to 10 parts of chlorosulphonated polyethylene, and from 110 to 137 parts of total reinforcing filler made up of from 15 to 40 parts of zinc oxide, from 20 to 47 parts of titanium dioxide, and from 30 to 50 parts of silica dioxide, all parts based on 100 parts by weight of copolymer and chlorosulfonated polyethylene.

10. A light-colored sidewall tire, comprising a rubber-fabric body containing migratory stain-producing materials, a stain-vulnerable, light colored sidewall, and a non-staining rubbery sheet between and bonded to said sidewall and said body, said sheet being imprevious to migration of said stain producing materials, said sheet comprising from 70 to 90 parts of a copolymer of at least 80% by weight of isobutylene and at least 20% by weight of isoprene, 30 to 10 parts of chlorosulphonated polyethylene, and from 110 to 137 parts total of a reenforcing filler, made up of from 15 to 40 parts of zinc oxide, from 20 to 47 parts of titanium dioxide, and from 30 to 50 parts of silica dioxide, all parts based on 100 parts by weight of copolymer and chlorosulfonated

[1] Sold by E. I. du Pont de Nemours, Wilmington, Delaware.
[2] Sold by Columbia Southern Chemical Co., Barberton, Ohio.

polyethylene, said barrier being impervious to the passage of said migratory staining materials.

References Cited in the file of this patent

UNITED STATES PATENTS

| | | |
|---|---|---|
| 2,240,855 | Phillips | May 6, 1941 |
| 2,240,856 | Phillips | May 6, 1941 |
| 2,566,328 | Hessney et al. | Sept. 4, 1951 |
| 2,566,329 | Hessney et al. | Sept. 4, 1951 |
| 2,731,060 | Rowe | Jan. 17, 1956 |

FOREIGN PATENTS

| | | |
|---|---|---|
| 713,596 | Great Britain | Aug. 11, 1954 |

OTHER REFERENCES

Du Pont Information Bulletin "Hypalon S-2 Blends With Other Elastomers," No. X-35, April 15, 1952.

Du Pont Information Bulletin "Hypalon S-2 White Sidewall Tire Composition," No. X-36, April 15, 1952.